US009743014B2

(12) United States Patent
Tate et al.

(10) Patent No.: US 9,743,014 B2
(45) Date of Patent: Aug. 22, 2017

(54) IMAGE RECOGNITION SYSTEM, IMAGE RECOGNITION APPARATUS, IMAGE RECOGNITION METHOD, AND COMPUTER PROGRAM

(71) Applicant: CANON KABUSHIKI KAISHA, Tokyo (JP)

(72) Inventors: Shunta Tate, Tokyo (JP); Tsuyoshi Kuroki, Yokohama (JP); Tomoaki Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 14/733,547

(22) Filed: Jun. 8, 2015

(65) Prior Publication Data
US 2015/0363636 A1 Dec. 17, 2015

(30) Foreign Application Priority Data
Jun. 12, 2014 (JP) ................................. 2014-121862

(51) Int. Cl.
G06K 9/00 (2006.01)
H04N 5/247 (2006.01)
(52) U.S. Cl.
CPC ......... *H04N 5/247* (2013.01); *G06K 9/00295* (2013.01)
(58) Field of Classification Search
None
See application file for complete search history.

(56) References Cited

U.S. PATENT DOCUMENTS

| 7,421,097 | B2 | 9/2008 | Hamza |
| 7,532,215 | B2* | 5/2009 | Yoda ....................... G06T 15/30 345/424 |
| 8,116,534 | B2 | 2/2012 | Nishiyama |
| 8,184,870 | B2* | 5/2012 | Li ....................... G06K 9/00248 382/118 |
| 8,407,248 | B2* | 3/2013 | Betouin .................. G06F 21/31 380/28 |

(Continued)

OTHER PUBLICATIONS

Adrian Hilton, et al., "3D-TV Production from Conventional Cameras for Sports Broadcast", IEEE Trans. Broadcasting: Special Issue 3D-TV Horizon, vol. 57, No. 2, p. 462-476, Jun. 2011.

(Continued)

*Primary Examiner* — Nancy Bitar
(74) *Attorney, Agent, or Firm* — Canon USA, Inc. I.P. Division

(57) ABSTRACT

A relative direction relationship is acquired between first and second input area images of a particular person taken from different directions. The particular person is identified by comparing a feature of the first input area image with a feature of a first one of registered area images of the particular person or another person taken from at least three directions, comparing a feature of the second input area image with a feature of a second registered area image of the same person as the person of the first registered area image, and determining whether the person in the first and second input area images is the same person in the first and second registered area images. The first and second registered area images are selected such that the relation between the first and second registered area images is similar to the relation between the first and second input area images.

17 Claims, 11 Drawing Sheets

(56) References Cited

U.S. PATENT DOCUMENTS

| | | | |
|---|---|---|---|
| 8,659,613 B2* | 2/2014 | Meier | H04N 5/23293 |
| | | | 345/581 |
| 2003/0123713 A1 | 7/2003 | Geng | |
| 2004/0136574 A1* | 7/2004 | Kozakaya | G06K 9/00228 |
| | | | 382/118 |

OTHER PUBLICATIONS

P. Felzenszwalb, et al., "Object Detection with Discriminatively Trained Part Based Models", IEEE Transactions on Pattern Analysis and Machine Intelligence, vol. 32, No. 9, Sep. 2010.
S. M. Khan, et al., "A multiview approach to tracking people in crowded scenes using a planar homography constraint". In Proc. European Conf. on Computer Vision, 2006.
Anthony Dearden, et al., "Tracking Football Player Movement From a Single Moving Camera Using Particle Filters", in Proceedings of CVMP-2006, pp. 29-37, IET Press, 2006.
Wei-Yin Loh, et al., "Classification and Regression Tree Methods", In Encyclopedia of Statistics in Quality and Reliability, Ruggeri, Kenett and Faltin (eds.), 315-323, Wiley, 2008.

\* cited by examiner

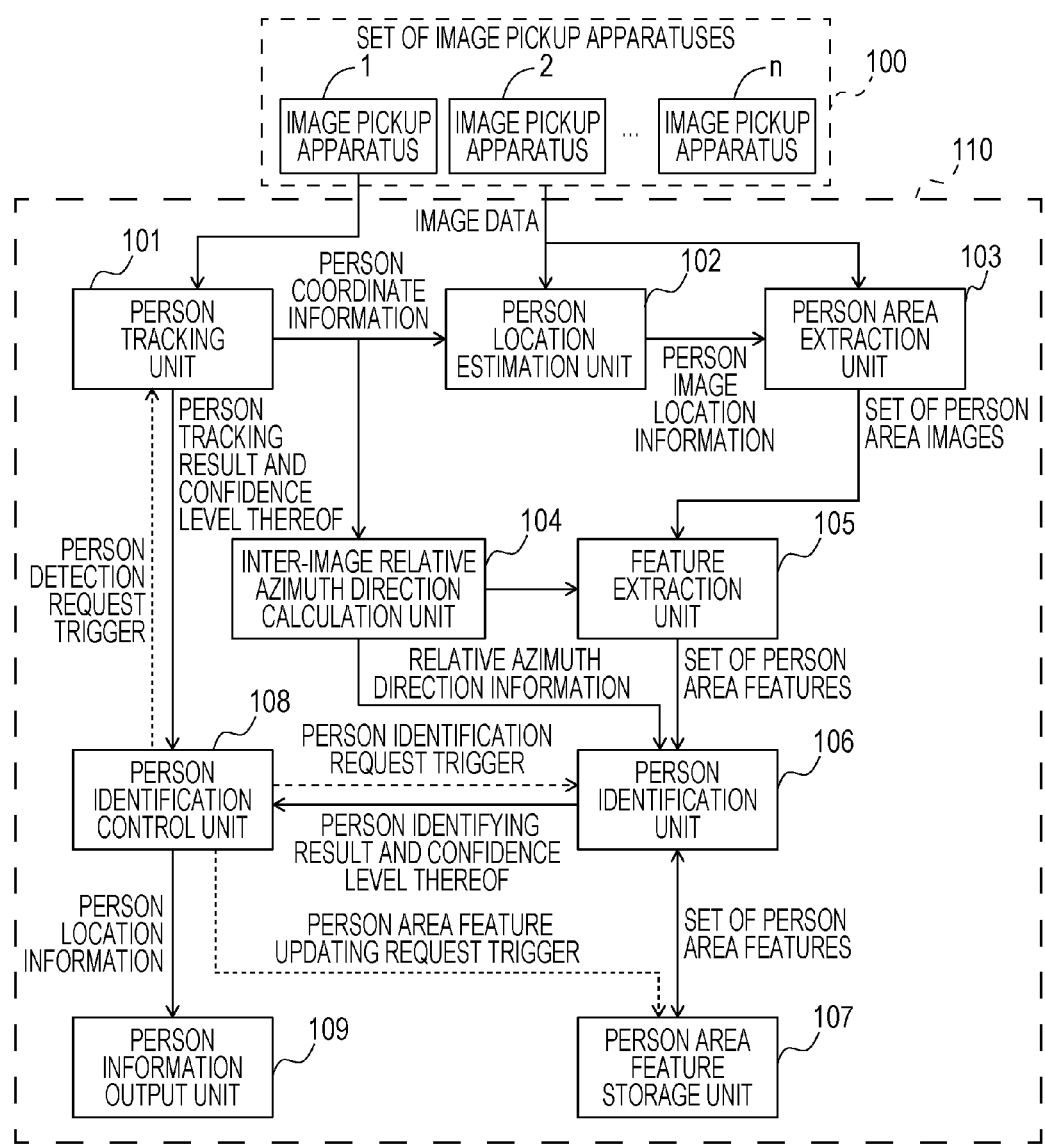

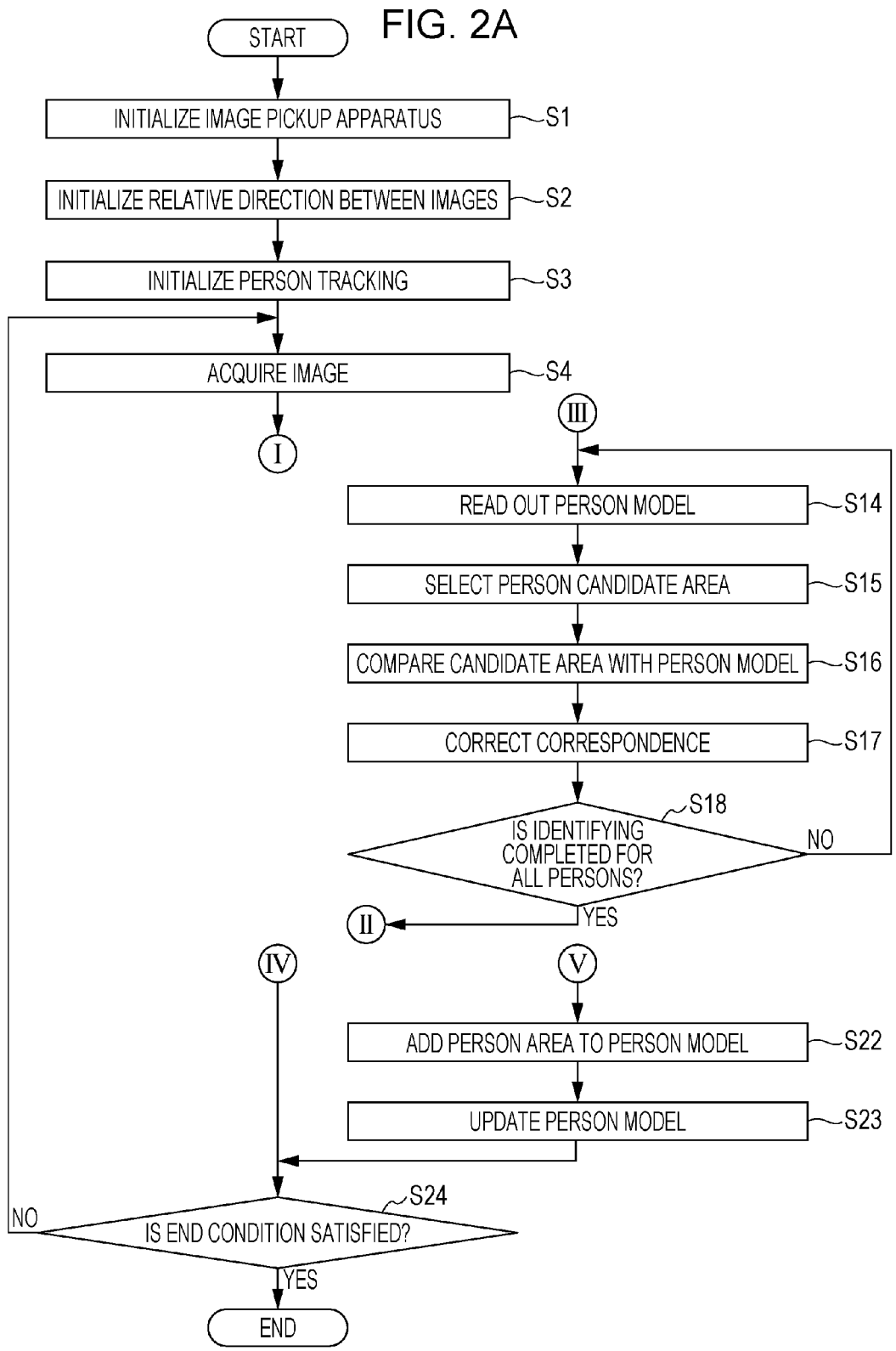

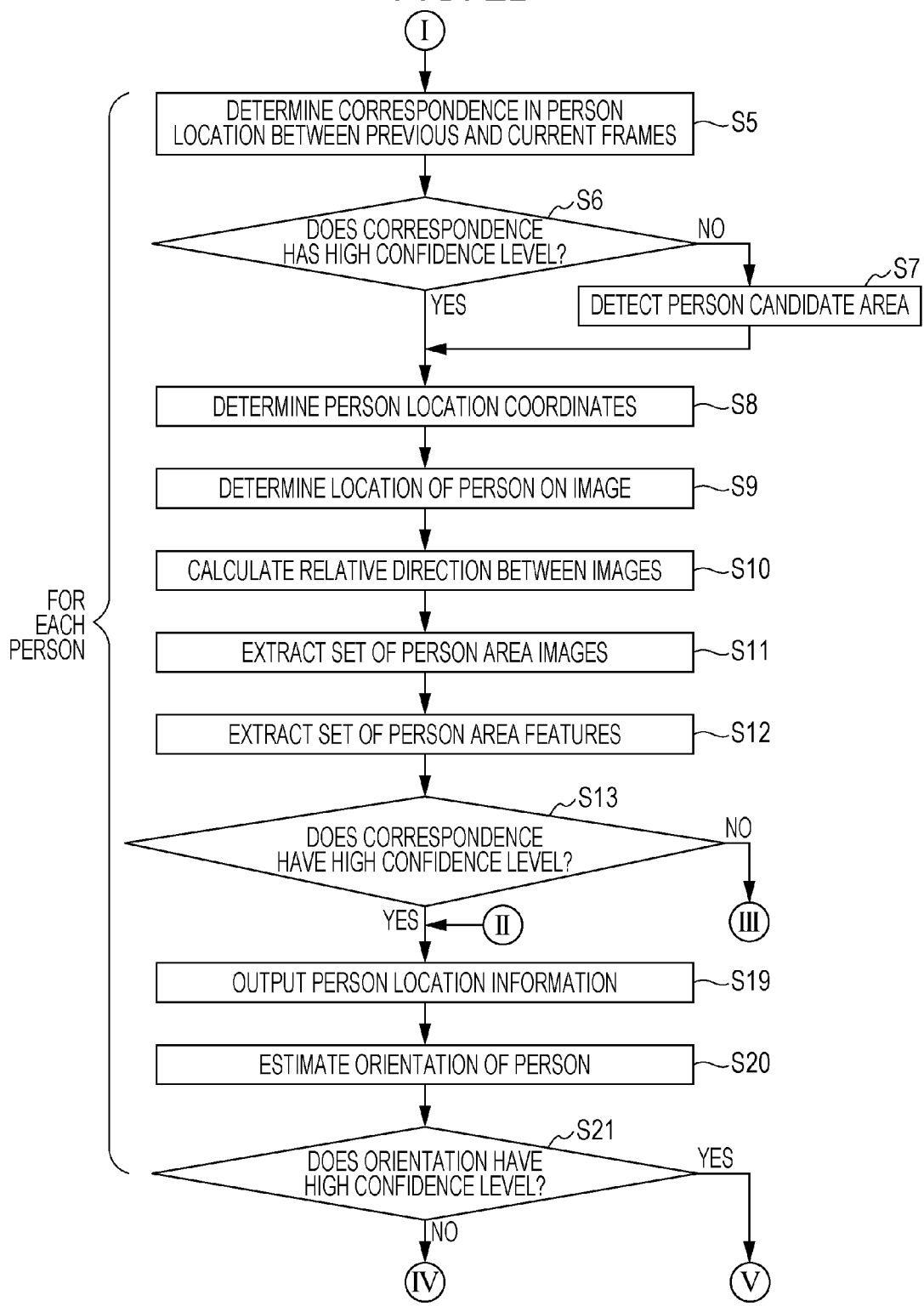

IMAGE RECOGNITION SYSTEM, IMAGE RECOGNITION APPARATUS, IMAGE RECOGNITION METHOD, AND COMPUTER PROGRAM

BACKGROUND OF THE INVENTION

Field of the Invention

The present invention relates to a technique of tracking a person in an image, and more particularly, to an image recognition system or the like configured to track a moving person by using images taken by a plurality of cameras in terms of a sports scene or in a security camera application, or the like.

Description of the Related Art

Conventionally, a system is known in which a moving image of group sports such as soccer, rugby, or the like is taken, and a plurality of persons are automatically detected and tracked and history of locations is recorded. In this system, there is a possibility that tracking fails in a particular situation in which many players gather in a small area, a player moves out of a screen, or in other various difficult situations. When tracking fails, it is necessary to perform a redetermination of a correspondence in terms of persons by making a comparison between a previous image and a current image or correct the correspondence manually by an operator.

A method of identifying a person in a situation such as that described above is disclosed, for example, in U.S. Pat. No. 8,116,534. In the method disclosed in U.S. Pat. No. 8,116,534, a plurality of cameras are installed in a place such as a corridor, and an image of a person passing through the corridor is taken by each camera from an approximately frontal direction. A face area of the person is detected from each image, and each face image is corrected so as to obtain an approximately frontal face. A feature value is then extracted from each corrected face image. A set of feature values is analyzed using a subspace method to identify the person. In this method, use of a plurality of images makes it possible to achieve better robustness than is achieved by a method using a single camera.

SUMMARY OF THE INVENTION

The present invention provides an image recognition system or the like capable of identifying a freely moving person quickly on a real-time base in a robust manner.

In an aspect of the invention, an image recognition apparatus includes an inter-image relative direction acquisition unit configured to acquire a relative direction relationship between a first input area image and a second input area image obtained by taking images of a particular person from different directions, a person identification unit configured to identify the particular person by comparing a feature of the first input area image with a feature of a first registered area image included in a set of registered area images including registered area images obtained by taking images of the particular person or another person from at least three azimuth directions, comparing a feature of the second input area image with a feature of a second registered area image of the same person as the person of the first registered area image included in the set of registered area images, and determining whether the person in the first and second input area images is the same as the person in the first and second registered area images, wherein the first registered area image and the second registered area image are selected such that the relative direction relationship between the first registered area image and the second registered area image is equal or similar to the relative direction relationship between the first input area image and the second input area image.

Further features of the present invention will become apparent from the following description of exemplary embodiments with reference to the attached drawings.

BRIEF DESCRIPTION OF THE DRAWINGS

FIG. 1 is a diagram illustrating a basic functional configuration of an image recognition system according to an embodiment.

FIGS. 2A and 2B are flow charts illustrating a process according to a first embodiment.

DESCRIPTION OF THE EMBODIMENTS

Figure 3A:
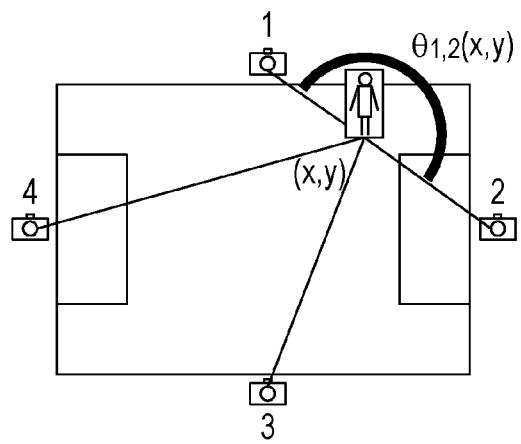
FIGS. 3A and 3B are diagrams illustrating a manner in which a relative azimuth direction of a person seen from each camera changes depending on a location of the person.

An image recognition system, an image recognition apparatus, an image recognition method, and a computer program according to embodiments are described in detail below with reference to drawings.

In conventional related techniques, it is assumed that an image of a frontal or nearly frontal face is taken. However, in sports scenes, a situation may occur in which a frontal image of a person of interest is not taken by any camera, for example, when the person of interest is hidden behind a crowd of people or cameras are performing a panning or zooming operation to take images of areas other than the area of the person of interest. In such a situation, it is necessary to wait for a frontal image to be taken again, which may impede a real-time operation.

U.S. Pat. No. 7,421,097 discloses a technique in which images of a person are taken at a plurality of angles, and features of faces of the images are compared with a registered image to identify the person. However, in this method, it is difficult to make an accurate comparison unless an orientation of a face in each image is known or always fixed. It is difficult to accurately estimate face orientations in images taken by cameras for persons who freely move in a large area such as a stadium. This may make it difficult to use this method disclosed in U.S. Pat. No. 7,421,097.

First Embodiment

A first embodiment discloses an example of an image recognition system in which a plurality of cameras take images of a plurality of players moving in a playing field, and continuously output distinctively locations of the respective players. Hereinafter, it is assumed by way of example that locations of players are output in real time, although the present embodiment may be applied to a case where the recognition process is performed off-line.

Note that in the present embodiment, it is assumed that players in a playing field are identified and tracked, but the image recognition system or the like according to the present embodiment is not limited to the use in such a situation. The image recognition system may also be used in various situations, for example, in watching a public space, labor management in an office, a factory, or the like.

An example of an image recognition system or the like according to the present embodiment is described below with reference to drawings. FIG. 1 illustrates a basic configuration of an image recognition system according to a present embodiment.

The image recognition system includes a set of image pickup apparatuses 100 including two or more image pickup apparatuses, and an image recognition apparatus 110. The image recognition apparatus 110 includes an inter-image relative direction calculation unit 104 and a person identification unit 106. The image recognition apparatus 110 further includes a person tracking unit 101, a person location estimation unit 102, a person area extraction unit 103, a feature extraction unit 105, a person area feature storage unit 107, a person identification control unit 108, and a person information output unit 109.

The set of image pickup apparatuses 100 includes two or more cameras for capturing image data and more specifically image pickup apparatuses 1 to n. The number of image pickup apparatuses, n, is set arbitrarily.

Hereinafter, it is assumed by way of example that image data is of a color moving image. However, the set of image pickup apparatuses 100 may deal with image data in various formats such as an infrared image, a three-dimensional image, or the like. Each image pickup apparatus in the set of image pickup apparatuses 100 takes an image in a playing field from a predetermined location. In the present embodiment, the set of image pickup apparatuses 100 may include a fixed camera configured to take an image of a fixed area and one or more pan/tilt/zoom cameras capable of a pan/tilt/zoom operation under the control of an operator. In the present embodiment, it is assumed that each camera location is fixed. Furthermore, it is also assumed for simplicity that the change in the principal point of a lens is negligible small in a panning, tilting, or zooming operation. Furthermore, in the present example, it is also assumed that the image pickup apparatus 1 is a fixed camera that takes an image of a whole playing field, and the other image pickup apparatuses 2 to n are pan/tilt/zoom cameras. Each camera may be a 4K camera capable of taking an image with a resolution of about 4000×2000 pixels or a 8K camera capable of taking an image with a resolution of about 8000×4000 pixels. In a case where a 4K camera or a 8K camera is used, an image may be taken without performing panning or tilting A plurality of images (input images) of a particular person taken from various azimuth directions by a plurality of image pickup apparatuses will also be referred to collectively as a set of input images, and an image obtained by extracting a part of an area of an input image will also be referred to as input area image.

The person tracking unit 101 detects a plurality of persons from an image (input image) taken by the image pickup apparatus 1, which is a fixed camera, and tracks the plurality of persons. The tracking is a process of determining a correspondence in terms of each person between two temporally adjacent image frames. That is, the person tracking unit 101 estimates location coordinate information (person coordinate information) of a person in two image frames and tracks the movement of this person between the two image frames. The person tracking unit 101 outputs a tracking result (a person tracking result) together with a confidence level thereof. In general, in a circumstance in which a plurality of persons move simultaneously, it is difficult to perform perfect tracking of persons. In a case where tracking fails in such a situation, a process of identifying a person and correcting a location of the person is performed again as described later.

The person location estimation unit 102 estimates a location (a person location) and a range where each person exists in each image data taken by corresponding one of the image pickup apparatuses 2 to n based on the person coordinate information estimated by the person tracking unit 101.

The person area extraction unit 103 extracts a person area (an area image) from each image based on the location of each person in the image (person image location information) estimated by the person location estimation unit 102.

The inter-image relative direction calculation unit 104 receives the person coordinate information estimated by the person tracking unit 101 and calculates a difference in angle between azimuth directions of images (area images) of the person taken by the image pickup apparatuses 1 to n.

The feature extraction unit 105 extracts, from the set of person area images (each area image), a feature value (a feature of each area image) that is a clue for identifying each person.

The person identification unit 106 identifies the person by comparing the set of feature values (the features of the input area images) received from the feature extraction unit 105 with the set of feature values (the features of registered area images) stored in the person area feature storage unit 107. In this identifying process, the person identification unit 106 receives information about the above-described relative direction relationship between images from the inter-image relative direction calculation unit 104, and takes into account this information in the comparison of the set of feature values. Note that the person identifying process includes a process of determining whether different images are of the same person.

A plurality of images (registered images) stored in the person area feature storage unit 107 will also be referred to collectively as a set of registered images. An image obtained by extracting a part of an area of a registered image will also be referred to as a registered area image, and a plurality of registered area images will also be referred to collectively as a set of registered area images.

The person identification control unit 108 receives information associated with the person tracking result and the confidence level thereof from the person tracking unit 101, and, as required, transmits a trigger to the person identification unit 106 to request it to perform a person identification process. The person identification control unit 108 receives a result of the identification from the person identification unit 106 and corrects the correspondence (corrects the person location coordinate information). The person information output unit 109 outputs location coordinates of the respective persons obtained in the above-described manner.

A flow of a process performed by the image recognition system is described below with reference to a flow chart illustrated in FIG. 2.

First, in step S1, the image pickup apparatuses 1 to n are initialized. In this initialization process, calibration is performed such that the location of an object in a field in an image taken by each camera is correctly expressed in a world coordinate system. In this calibration process, for example, first, an image of a calibration plate including a plurality of markers the distance between which is known is taken. Based on locations of the markers in the taken image, a conversion parameter to be used in correcting distortion of an image caused by an optical system is determined, and an image conversion table is produced. By converting an image using this conversion table, it becomes possible to obtain a captured image with no distortion. In a case where the image distortion parameter changes as a camera zoom operation is performed, an image of the calibration plate is taken a plurality of time for different focal lengths, and a plurality of conversion tables are produced. In converting an image, a proper conversion table is selected depending on the focal length and the conversion is performed using the selected conversion table. Next, using the image of the calibration plate subjected to the distortion correction, an intrinsic parameter matrix of a camera at a principal point location or the like is estimated.

Next, an extrinsic parameter matrix of each camera is determined as follows. That is, images of predetermined reference objects such as white lines in a field, intersections thereof or the like are taken and locations of these reference objects in the images are detected. Thereafter, the extrinsic parameter matrix is determined under a constraint condition that the field is a flat plane. A description of a specific example of this calibration process may be found, for example, in Adrian Hilton, et al., "3D-TV Production from Conventional Cameras for Sports Broadcast", IEEE TRANS. BROADCASTING: SPECIAL ISSUE 3D-TV HORIZON, 2011, or the like. By performing the calibration process in the above-described manner, it becomes possible to estimate the location of the camera in the world coordinate system with the origin set at the field of the playing field. Furthermore, when the imaging range of a camera is changed by performing a panning operation, the locations of the white lines and the intersections described above are detected and the extrinsic parameter matrix is estimated so as to make it possible in any situation to determine the location, as expressed in the world coordinate system, of a point in the field being subjected to the image capture operation.

The technique of calibrating cameras so as to make it possible to correctly express locations by any camera in the manner as disclosed in Adrian Hilton, et al., "3D-TV Production from Conventional Cameras for Sports Broadcast", IEEE TRANS. BROADCASTING: SPECIAL ISSUE 3D-TV HORIZON, 2011 or the like is a well established technique and is used, for example, in superposing of CG on a live sports broadcast image and thus a further detailed description thereof is omitted hereon.

There is a possibility that when a zooming-in operation is performed during an operation of taking an image of a game, only a part of or even no part of a reference object such as a white line or the like is captured in the image or even nothing thereof is captured in the image. In this case, it is difficult to determine the correspondence between the image coordinate system and the world coordinate system. Therefore, an image taken by this camera may not be used in a recognition process which will be described later. When an operator performs a zooming-out operation until it is possible to determine the correspondence between the image coordinate system and the world coordinate system, then the image taken by this camera may be used again in the recognition process.

Alternatively, a camera may additionally include a sensor such as an encoder, a gyroscope, or the like to sense and output an amount of a panning/tilting/zooming operation of the camera so as to make it possible to determine the correspondence between the image coordinate system and the world coordinate system. Alternatively, a value output from the sensor may be used to complement the location detection by the image recognition.

In step S1, furthermore, a range in the area in the field is set so as to limit the tracking operation. This makes is possible to prevent a spectator or the like other than a player from being incorrectly recognized as a player.

Figure 3B:
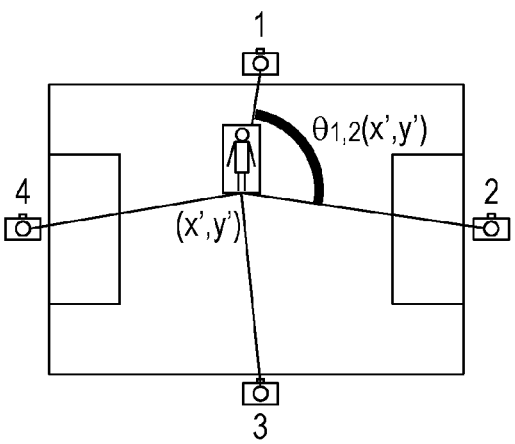

Next, in step S2, the inter-image relative direction calculation unit 104 is initialized so as to make it possible to calculate the relative azimuth direction of a person in the field seen from each camera. This process is described in further detail below with reference to FIGS. 3A and 3B. These figures indicate that an angle at which a person is seen from each camera changes depending on the location of the person in the field. For example, in FIG. 3A, when the camera 1 is taking an image of a person located at (x, y) as expressed in the world coordinate system, the camera 2 is taking an image from a direction opposite to that of the camera 1. That is, there is a relative angle difference $\theta_{1,2}(x, y)$ of 180° between the directions in which the person at the location (x, y) is taken by the cameras 1 and 2. Furthermore, for example, when the person moves to a location (x', y') as illustrated in FIG. 3B, the relative angle difference $\theta_{1,2}(x', y')$ changes to 90°. That is, in the present processing step, all values of relative angle differences between cameras depending on the person location are determined and stored so as to make it possible to use the values later in the recognition process. This process may be performed using one of methods. For example, in one method, a field is divided into a fixed lattice, and the value described above is determined and stored for each lattice point.

In another method, for example, a modified cosine formula described below is stored, and the relative angle difference $\theta(x, y)$ is determined by substituting x and y values of the location of the person into the formula for each location.

$$\theta(x,y)=a\cos((b^2+c^2-a^2)/2bc)$$

$$a=\mathrm{sqrt}((x1-x2)^2+(y1-y2)^2)$$

$$b=\mathrm{sqrt}((x1-x)^2+(y1-y)^2)$$

$$c=\mathrm{sqrt}((x2-x)^2+(y2-y)^2)$$

In this formula, acos( ) denotes an arccosine function, sqrt( ) denotes a function that returns the square root of an argument. (x1, y1) and (x2, y2) denote locations of the respective cameras 1 and 1 as expressed in the world coordinate system.

In the example described above, there are only two cameras. When there are three or more cameras, the angle difference between cameras may be determined and stored as follows. That is, for example, the camera 1 is selected as a reference camera, and angle differences $\theta_{1,2}, \theta_{1,3}, \ldots, \theta_{1,n}$ of the respective cameras with respect to the camera 1 are determined and stored. To determine the relative angle difference between arbitrary cameras i and j, the sum is calculated according to a following formula.

$$\theta_{i,j}=\theta_{1,i}+\theta_{1,j}$$

Next, in step S3, the person tracking unit 101 is initialized based on an image recognition result or an instruction given by a user. In this step, the instruction may be given differently depending on recognition accuracy required for the image recognition system and/or a maximum allowable degree of labor of a user. In the present example, it is assumed that the person tracking unit 101 is initialized according to information described below given by a user.
(1) The total number of players of two teams and the number of referees.
(2) An instruction to correct an error in a person detection result.

The process of initializing the person tracking unit 101 is described in further detail below.

Figure 4:
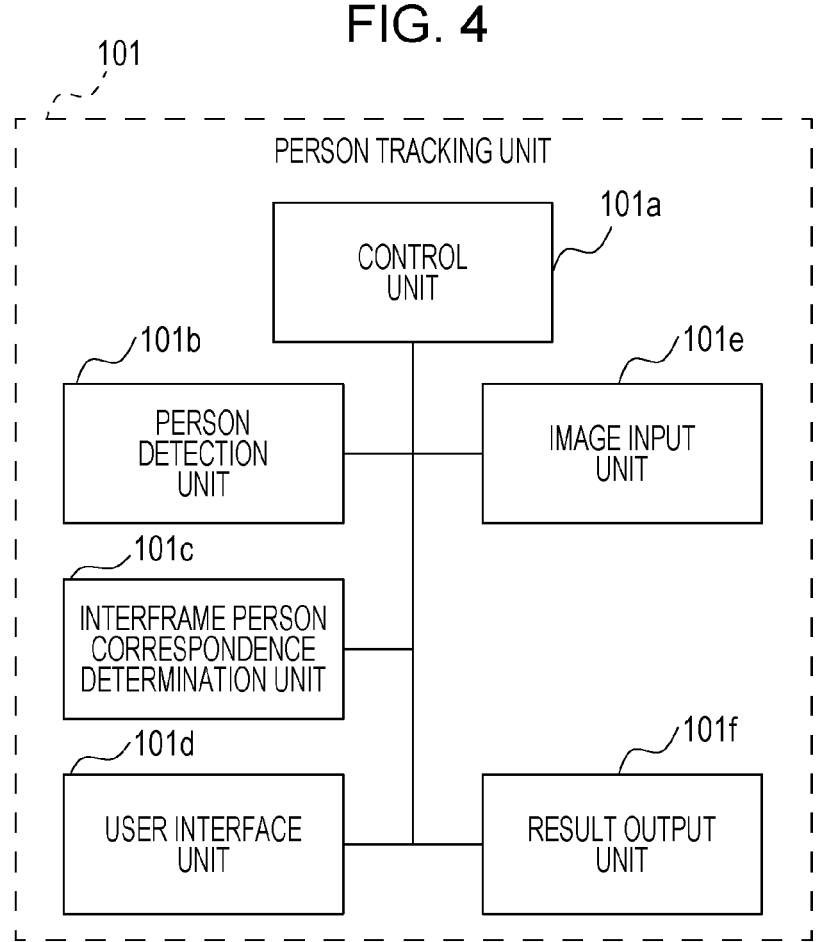
FIG. 4 is a diagram illustrating detailed functions of a person tracking unit 101.

FIG. 4 is a diagram illustrating detailed functions of the person tracking unit 101.

The person tracking unit 101 includes, for example, a control unit 101a, a person detection unit 101b, an interframe person correspondence determination unit 101c, a user-interface unit 101d, an image input unit 101e, and a result output unit 101f.

The person detection unit 101b detects a person based on an image taken by the image pickup apparatus 1. The person detection may be performed using an arbitrary method. For example, a generally employed method such as that disclosed in P. Felzenszwalb, et al., "Object Detection with Discriminatively Trained Part Based Models", IEEE Transactions on Pattern Analysis and Machine Intelligence, Vol. 32, No. 9, September 2010, or the like may be employed.

In the present embodiment, the person detection is performed only based on the image taken by the image pickup apparatus 1 which is one of the set of image pickup apparatuses and which is a fixed camera. Alternatively, to achieve higher reliability in detecting the person, the person detection may be performed based on images taken from a plurality of directions by a plurality of image pickup apparatuses, as disclosed, for example, in S. M. Khan, et al., "A multiview approach to tracking people in crowded scenes using a planar nomography constraint". In Proc. European Conf. on Computer Vision, 2006.

In a case where all players and all referees are not detected, the person tracking unit 101 notifies a user of this fact. In response, the user may give an instruction so as to detect correct locations of the respective persons via the user interface unit 101d. After all persons have been correctly detected, the person tracking unit 101 assigns a unique identifier ID to each person. The identifier ID given herein is an initial value of the ID identifying each person and its location.

In an alternative method, information described below may be given, although in this method a user is supposed to do a relatively large amount of operation.
(3) A set of area images prepared in advance by taking faces of players and referees from a plurality of directions.

By giving such information, it becomes possible to increase accuracy in a process of identifying persons (described later).

Thus the person tracking unit 101 is initialized as described above.

Next, the processing flow proceeds to step S4, and a process from step S4 to step S20 is performed repeatedly to track moving of persons during a period in which a game is being recorded. The person information output unit 109 continues to output the location of each person together with its identifier ID until an end state such as an end of a game or the like is reached.

First, in step S4, images are acquired such that each of the image pickup apparatuses 1 to n takes an image of an area currently aimed at by each camera.

Next, in step S5, the interframe person correspondence determination unit 101c in the person tracking unit 101 estimates a motion vector indicating a movement of each person from a location in an immediately previous frame to a location in a current frame. This process may be performed, for example, using a widely known technique such as a template matching method, a particle filtering method, or the like. A description thereof may be found, for example, in Anthony Deardena, et al., "Tracking Football Player Movement From a Single Moving Camera Using Particle Filters", in Proceedings of CVMP-2006, pp. 29-37, IET Press, 2006, and thus a further description herein is omitted.

The interframe person correspondence determination unit 101c outputs a score indicating the confidence level of the tracking result. In a case where the score is calculated using the template matching method or the like, the score is given by a normalized correlation value or the sum of squares of differences in luminance value. In a case where the score is calculated using the particle filtering method or the like, the score is given by an average likelihood value of particles or the like. A lower score is output when person similarity between adjacent frames is very low which may occur when a wrong person is captured or a person of interest is hidden behind something. In a case where a person moves out of the screen or the range in which the person detection is allowed, when a player is changed or for any other reason, the interframe person correspondence determination unit 101c outputs a state value indicating that such a situation occurs in addition to the score.

Next, in step S6, the person identification control unit 108 receives the tracking result and the confidence level of the person tracking performed in the previous step, and the person identification control unit 108 determines whether the determination of the correspondence between adjacent frames for each person is performed with a confidence level equal to or higher than a threshold value. If the confidence level of the correspondence is lower than the threshold value for a particular person, the person identification control unit 108 determines that the tracking of this person has failed, and the person identification control unit 108 transmits a trigger signal to the person tracking unit 101 to request it to detect this person.

If the person tracking unit 101 receives the person detection request trigger signal described above, then the person tracking unit 101 performs an operation in step S7. More specifically, the person tracking unit 101 performs the person detection process on the image taken by the image pickup apparatus 1 in a similar manner to the process performed in step S3. Among a plurality of areas detected as person candidates, areas with likelihood scores equal to or higher than a predetermined value are extracted. Of these extracted areas, an area is discarded if the area has a larger amount of overlap with any area of persons being currently tracked than a predetermined maximum amount, and remaining areas are output as person candidate areas.

In the following steps from step S8 to step S12, face images taken from a plurality of directions for each person are extracted from images and features thereof are then extracted.

First, in step S8, the person tracking unit 101 calculates the location expressed in world coordinate system from the location of each person, being under tracking, (and person candidates) in the image taken by the image pickup apparatus 1. This may be accomplished by performing a conversion using the extrinsic camera parameter of the image pickup apparatus 1 obtained via the calibration process in step S1.

Next, in step S9, the person location estimation unit 102 calculates the locations and the sizes of the respective persons as expressed in the world coordinate system and determines how these locations and the sizes correspond to the locations and the areas of the images taken by the respective image pickup apparatuses 2 to n. Also this process, as with the process in step S8, may be accomplished by performing a coordinate transform using the estimated camera parameter.

In a case where an image taken includes no reference marker and thus it is not capable of estimating the camera parameter, the location correspondence is not known for this image pickup apparatus, and this image pickup apparatus is not used in the following process, as described above in step S1.

Next, in step S10, based on the information about the location (x, y) of each person, the inter-image relative direction calculation unit 104 calculates the value of the angle difference between relative directions in which the person is seen from the respective cameras in the same manner as described in step S2. As a result, relative angle differences $\theta_{1,2}, \theta_{1,3}, \ldots, \theta_{1,n}$ between directions in which the person is seen from different image pickup apparatuses are obtained. Note that at this stage, the absolute orientation of each person is not yet known.

Next, in step S11, the person area extraction unit 103 extracts a head area of each person seen from each image pickup apparatus. More specifically, the position adjustment is performed by detecting persons in the vicinity of a person of interest in the image, and extracting an average location of a head from the area. A description of a specific example of a method usable in this process may be found, for example, in P. Felzenszwalb, et al., "Object Detection with Discriminatively Trained Part Based Models", IEEE Transactions on Pattern Analysis and Machine Intelligence, Vol. 32, No. 9, September 2010.

Next, in step S12, the feature extraction unit 105 extracts a proper feature value for identifying each person from a set of obtained images of heads of respective persons. In the present embodiment, for example, to ensure that the person identification is correctly performed robustly against a fluctuation of illumination, each image is converted into Laplacian of Gaussian (LoG) image, and the resultant image is employed as a feature value of the image. However, the feature value is not limited to this example. For example, a local binary pattern (LBP) feature, a histogram of oriented gradient (HOG) feature, or the like may also be employed as long as it is possible to identify a person.

At this stage of the process, images of areas of a particular person under tracking (and person candidate areas) taken from a plurality of directions and feature values thereof have been extracted.

Next, in step S13, the person identification control unit 108 selects a process depending on whether there is a person with a lower confidence level than a predetermined value during the tracking process performed by the person tracking unit 101. In a case where there is a person with a low tracking confidence level, an ID of this person together with a request trigger signal is sent to the person identification unit 106 to request it to again perform the person identification. In this case, the processing flow proceeds to step S14 to again perform the person identification. On the other hand, in a case where all persons are being tracked with a high confidence level, the processing flow proceeds to step S19 without again performing the person identification. Alternatively, at predetermined fixed intervals, a person identification request trigger signal may be automatically transmitted to the person identification unit 106 to again perform the person identification.

In steps from step S14 to step S18, a process is performed to again identify a person whose tracking fails.

Figure 5A:
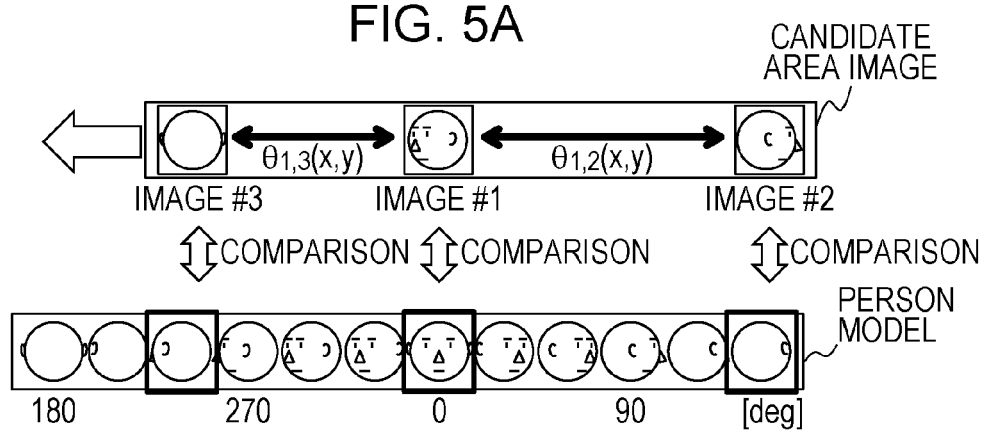
FIGS. 5A to 5C are schematic diagrams illustrating a method of identifying a person.

In step S14, the person identification unit 106 receives an ID of a person for which re-identification is requested, and reads out a person model assigned that ID from the person area feature storage unit 107. The person model refers to a model representing a feature of a face area of a person for each of all images seen from all azimuth directions as illustrated in FIG. 5A. An image of a face area stored (registered) in the person area feature storage unit 107 is also referred to as a registered area image. The images seen from all azimuthal directions include a set of images that are taken at proper timings immediately after the start of the tracking of the person.

Next, in step S15, a determination is performed as to the priority order of comparing candidate areas with the model of the person of interest to be identified. More specifically, in a case where person candidate areas have been detected in previous step S7, the priority is given according to the order of the likelihood of the areas being a person. Next, taking into the account the possibility that a wrong person correspondence may occur when a player is changed during a game or for some other reason, all areas of persons being under tracking are also employed as candidate areas. For these areas, the priority is given according to the order from the lowest tracking confidence level to higher confidence levels.

Next, in step S16, the person identification unit 106 judges each of the candidate areas determined in the above-described manner as to whether the candidate area matches the feature of the person model image (registered area image). More specifically, first, as illustrated in FIG. 5A, an image #1 of a candidate area is selected as a reference image and an assumption is made that this face has an orientation of 0°. Furthermore, the face orientations of images #2 and #3 are assumed such that the relative direction between the image #1 and the image #2 is $\theta_{1,2}$ and the relative direction between the image #1 and the image #3 is $\theta_{1,3}$. Note that in FIG. 5A, it is assumed that three images are taken by image pickup apparatuses from three different directions. Next, among model images seen from all azimuth directions (registered area images), an image is selected that is closest in angle to the assumed face orientation of each candidate area image, and candidate area image is compared with the selected model image to determination whether the image features thereof match each other. The comparison may be performed, for example, based on a normalized correlation, which is a most widely used comparison method. There is a possibility that the candidate area images and the person model images have certain deviations from ideal locations that may occur when the areas are extracted. Therefore, the comparison using the normalized correlation is performed a plurality of times while shifting the image of interest into xy directions within a predetermined range, and a greatest correlation value is employed as a match score.

Figure 5B:
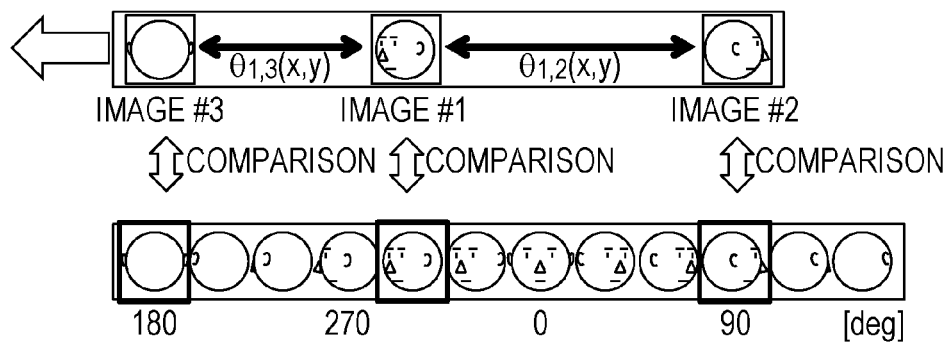
Figure 5C:
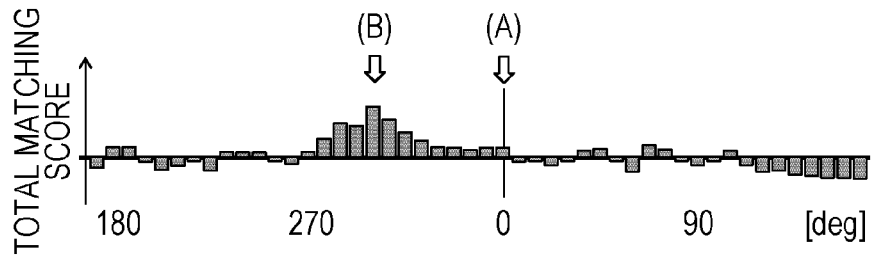

FIG. 5C illustrates an example of a sum of match scores obtained as a result of the comparison between images. The result of the comparison performed in FIG. 5A has a value pointed to by an arrow (A) in FIG. 5C. The comparison is performed a plurality of times while shifting the direction step by step over 360° while maintaining the relative interval $\theta$ between images of candidate areas. A greatest sum of match scores is obtained when the comparison is performed in the direction shown in FIG. 5B. This score is employed as degree of coincidence between the candidate area and the person model of the ID of interest. This score is pointed to by an arrow (B) in FIG. 5C.

When the sum of match scores is greater than a predetermined value, it is determined that the candidate area of interest corresponds to the person of the ID of interest, and the identification result is returned to the person identification control unit 108. In a case where the sum of match scores is not greater than the predetermined value, a candidate area in a next priority order is selected and is compared with the person model.

There is a possibility that at a stage immediately after the operation of the present image recognition system is started, the person model seen from all directions includes only a small number of registered images. In such a situation, when there is no face model image in a particular direction, an average face model image may be temporarily used in this particular direction. Alternatively, as described above in step S3, a user may prepare in advance data of a sufficient number of images seen from all azimuth directions.

In the comparison between a candidate area and a person model, there is a possibility that some image has a low normalized correlation value, for example, when a person is partially hidden by another person or for other reasons. To suppress influences of such a situation, a correlation value lower than a predetermined value may be regarded as an outlier and may be replaced with a value defined as a lower limit without being directly used. Alternatively, when an image of a face area is extracted from a candidate area, if a relative location of a person of interest with respect to another person indicates that the person of interest is likely to be partially hidden, this image may not be used.

In a case where an image of a person is taken in a wide angle mode by a camera located far from the person, there is a possibility that the resultant image is low in quality if the performance of the camera is not high enough. When such a low-quality image is compared with an image of a person model, a matching result is likely to be low in the confidence level. To handle the above situation, a weighting factor $w_r$ may be defined such that $w_r$ increases as the resolution of the image increases or as the distance of the person from the camera decreases, and match scores of a plurality of comparison results may be summed after multiplying each match score by $w_r$. This makes it possible to give high weights to high-quality images of images taken from a plurality of directions in the matching process.

In the comparison, instead of comparing each candidate area image with a model image with highest similarity in orientation to the candidate area or each face orientation as in the above-described manner, model images within a certain angle range may be all selected, and the candidate area image may be compared with these selected model images. In this case, a greatest match score of all comparison results or an average match score may be employed as a comparison result. Alternatively, matching scores may be weighted by weighting factors $w_r$ as in the previous examples.

Next, in step S17, the person identification control unit 108 corrects the person location information according to the result of identification performed by the person identification unit 106. In the correction process, for example, in a case where it turns out that the location of a person being tracked as a person A is actually the location of a person B, the location is corrected. In this case, furthermore, it is determined that tracking of the person A fails, and a request trigger is sent to the person identification unit 106 to request it to again person identification. In this way, the person re-identification process is repeated as many times as required.

Next, in step S18, if it is determined that the person identification control unit 108 has made the comparison with the candidate areas for all persons to be subjected to the re-identification, the person identification process is ended. In a case where no candidate area is found after all for a particular person, the location of this particular person is regarded as being unknown in this frame. In a case where a candidate area gets a high likelihood score in the person detection and thus there is a high probability that this candidate area is an area of a person, but nevertheless the area does not match any person model, the area is highly likely to be of a person who newly appears when a player is changed or for some other reason, and thus a new ID is assigned to this person and tracking is started.

Next, in step S19, the person identification control unit 108 outputs, to the person information output unit 109, the location of each person together with the ID related to the person determined in the previous steps, and they are stored as location information of the image frame.

Next, in step S20, the person identification unit 106 estimates the orientation of each person. This process may be performed in a similar manner to the process in step S16 of comparing the candidate area with the person model. The comparison is performed for a plurality of orientations, and an orientation for which a highest match score is obtained in the comparison is employed as the orientation of the person of interest.

Next, in step S21, the confidence level is determined for the estimated value in terms of the face orientation. More specifically, the confidence level is given by the greatest total match score determined above. In a case where the confidence level is high, the processing flow proceeds to step S22.

Next, in step S22 and step S23, a process is performed to newly add or update an image feature of a person to the person model. Via this process, information of person images is gradually accumulated during a game, and the reliability of the identification process increases. Furthermore, this process makes it possible to handle a change caused by adhesion of dirt or the like during the game.

In step S22, an image of a person is newly added to images of a person model seen from all azimuth directions. More specifically, a value of face orientation and a feature value of a face image estimated in step S20 are registered. In this registration process, registered information is gradually updated by replacing an oldest entry of registered image with a newest image. In this replacement process, an image with a high resolution may be given high priority so that it is kept without being replaced. To enhance the robustness of the person identification process, a plurality of images (up to n images) may be registered for one direction. In this case, when one candidate area image is compared with a model, the comparison is performed for up to n images, and a greatest score is employed as a match score thereof.

Next, in step S24, it is checked whether inputting is given by a user to notify that the game is ended. If not so, the processing flow returns to step S4 to repeat the above-described process until an end condition is satisfied. The general processing according to the present embodiment has been described above.

In the present embodiment, as described above, it is possible to identify and track a person in a playing field or the like based on images taken from a plurality of directions.

In the present embodiment, even in a situation in which a frontal image of a person is not taken, or in a situation in which images of a person are taken only by part of all image pickup apparatuses, it is possible to robustly identify the person in real time by comparing a set of images with a person model based on relative relationships among images.

In the above-described method of identifying a person, a face area is used as described above. However, alternatively, other parts of a person, for example, a trunk area may be employed as a person model. For example, in a sports game, it is useful to use a number described on the back of the trunk or the like to identify a person. Thus, by using a trunk area in addition to a face area, it becomes possible to further increase the identification accuracy compared with the case in which only the face area is used.

Figure 6A:
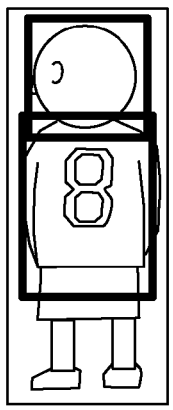
FIGS. 6A to 6C are schematic diagrams respectively illustrating a face model and a trunk model of a person.
Figure 6B:
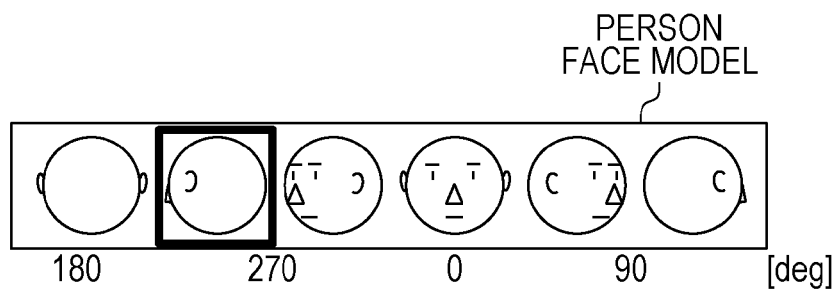
Figure 6C:
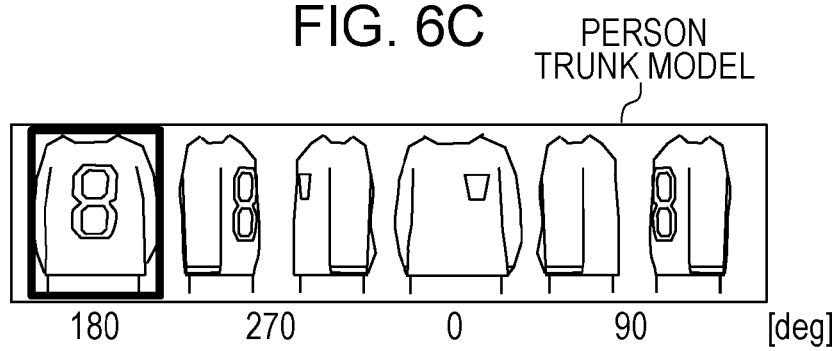

For example, as illustrated in FIG. 6A, a face area and a trunk area are separately extracted and stored as features of separate models. Using these stored features of separate models, template matching is performed. The reason why face and trunk areas are separately extracted is that the orientation of a face and the orientation of a trunk may be different from each other in some situation. Examples of results of template matching are represented by thick black frame lines in FIG. 6B and FIG. 6C. In such a case, for example, results of person identifications for two areas are weighted by properly weighting factors and the sum thereof is employed as a final identification result.

Second Embodiment

In a second embodiment described below, an image recognition system is configured in a similar manner to the image recognition system according to the first embodiment described above with reference to FIG. 1. However, in the second embodiment, person identification is performed in a manner different from that according to the first embodiment. Also in the present embodiment, it is assumed that relative directions between image areas of a person of interest are known, and a face orientation of the person is not known. In the first embodiment described above, the normalized correlation is used in comparing a face image feature of a candidate area with each one of face image features of a person model. In contrast, in the present embodiment, hashing is used to make a quicker comparison between a candidate area and a model. In the present embodiment, because it is possible to make a comparison at a high speed, it is possible to quickly compare a candidate area with all person models, and thus, in the present embodiment, it is assumed that the person identification is performed for each frame.

Figure 7:
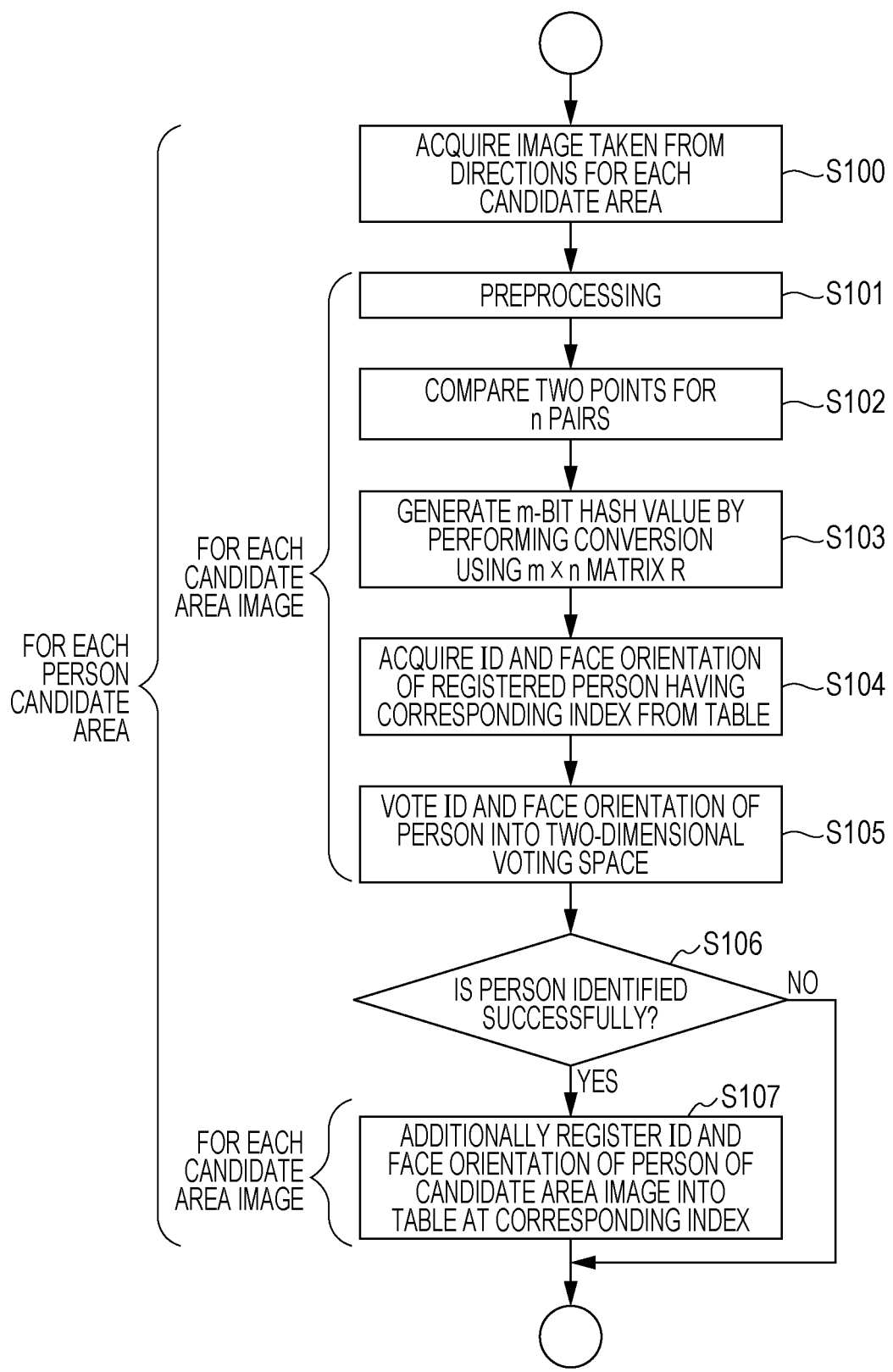
FIG. 7 is a flow chart illustrating a process according to a second embodiment.

FIG. 7 is a flow chart illustrating a characterizing part of a total person identification process according to the present embodiment.

First, in step S100, as in the first embodiment, a plurality of candidate areas regarded as being likely to be of a person are acquired from a person detection result or from person tracking results obtained until the previous frame. For each of these candidate areas, areas likely to be face areas are extracted from images taken from a plurality of directions, and employed as face candidate areas. Furthermore, values of relative azimuth directions (relative azimuth direction relationship) between images are acquired.

Next, in step S101, preprocessing is performed to convert the candidate areas into a form suitable for the person identification such as a LoG image or the like.

Figure 8:
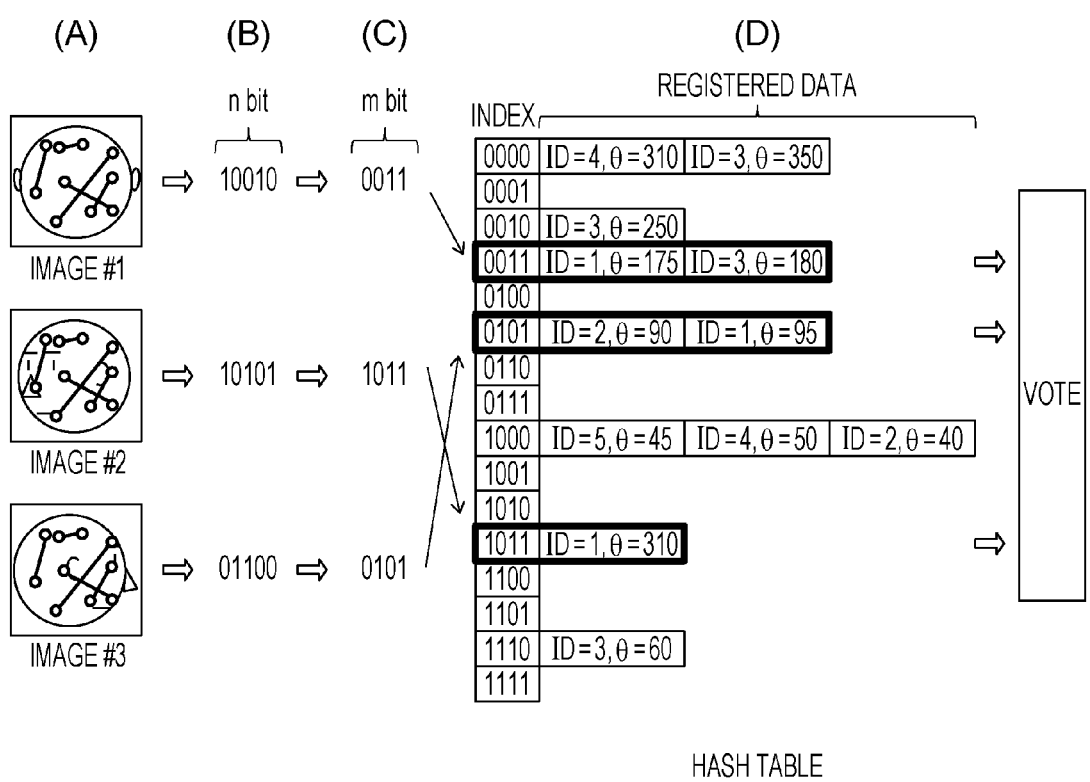
FIG. 8 is a diagram illustrating a method of comparing a candidate area and a person model by hashing.

Next, in a process from step S102 to step S105, a comparison is performed to detect a person model that has high similarity to the candidate area of interest. In the present embodiment, hashing is used as a method to achieve a high-speed comparison. First, in step S102, as illustrated in (A) in FIG. 8, a comparison in terms of luminance value is made between two points that are apart from each other by a predetermined distance for a plurality of pairs of points in each candidate area. As for pairs, n sets of random pairs are prepared, and the comparison is performed n times. As a result, a feature represented in a bit string with a length n is obtained for each candidate area. That is, each candidate area image is converted to a bit string with a length n ((B) in FIG. 8).

Next, in step S103, the n-bit string feature b obtained in the above-described manner is converted using an m×n random projection matrix R as described in a formula shown below. In this formula, R denotes a matrix whose elements have random values. After the conversion, the values of elements of the resultant bit string is converted either 0 or 1 depending on there signs. As a result, a hash value h is obtained in the form of a bit string with a length of m ((C) in FIG. 8).

$$h=(\text{sign}[Rb]+1)/2$$

where sign[ ] is a function that converts each element of a given vector to a positive or negative sign.

Next, in step S104, the hash value obtained in the above-described manner is used as an index, and an index of a corresponding hash table is checked to determine whether there is person data registered therein. The hash table is a table describing a hash value determined in advance for each face orientation of each of one or more registered persons. From the hash table, an ID and a face orientation (expressed by a variable θ in the present example) of a registered person are obtained as data of a person model that matches the candidate area ((D) in FIG. 8). As illustrated in (D) in FIG. 8, some index includes data registered for two or more models. In such a case, all pieces of data are acquired or alternatively only one piece of data of an image with a highest resolution among all pieces of data (an image taken at a distance closest to the person) may be acquired. On the other hand, in a case where there is no registered data at the index of interest, it is determined that the candidate area does not match any model, and a comparison is performed for a next candidate area.

Next, in step S105, voting is performed using information about person models acquired as being matched in step S104. More specifically, first, based on the difference in relative azimuth direction between the reference camera (the image pickup apparatus 1 in this specific example) and the candidate area image and the face orientation direction of the person model data that matches the candidate area image, a face orientation direction $θ_1$ of the person as seen from the reference camera 1 is determined according to a formula described below.

$$θ_1=θ_{1,j}-θ_j$$

where $A_{1,j}$ denotes the difference in relative azimuth direction between candidate area images taken by the respective camera 1 and camera j, and $θ_j$ denotes the face orientation direction of the data detected, in hashing, as matching the candidate area image taken by the camera j.

After the face orientation direction value θ for the person as seen from the camera 1 is estimated in the above-described manner, voting of the face orientation direction θ and the person ID is performed in a two-dimensional vote spate. In this process, the vote space for the face orientation direction θ is discretized in advance by properly binning.

Next, in step S106, the number of votes is calculated, and a bin is detected that got a greatest number of votes. If the number of votes for this bin is greater than a predetermined value, then it is determined that the candidate area of interest is of the person having the ID and the face orientation of interest.

Next, in step S107, only in a case where the identification is successful, the data of the successfully identified person is additionally registered in the hash table. More specifically, the ID and the face orientation value of each candidate area image are described at the index given by the hash value determined in step S103. As in the first embodiment, the hash table may be updated by removing old registered data from the hash table. This makes it possible to update the person model data while maintaining the maximum amount of data treated within a predetermined amount.

The process of quickly identifying persons using hashing has been described above.

Note that in the present embodiment, a conversion into a LoG image is performed in the preprocessing in step S101 as described above. However, alternatively, to enhance the identification performance, the data may be converted to a basis of an eigenface or the like which is a widely used technique of identifying faces.

In step S102 described above, instead of using pairs of two points at random locations, the locations of two points of each pair may be determined such that more distinguishable points are selected by searching such points using learning image data based on information criterion or the like.

In step S103 described above, the random projection matrix R is used. To prevent the projected data from being biased, a principal component analysis may be performed so as to uncorrelate the data before the conversion using the random projection matrix is performed. More specifically, for example, the face image data for learning is converted into n-dimensional hash values, and principal component analysis is performed on the n-dimensional data. In the principal component analysis, high-order k principal components are selected and a k×n reduced matrix P is produced. Next, an m×k random projection matrix R is produced, and a matrix obtained as a result of composition of P and R, that is, R'=RP is used as an m×n conversion matrix. Note that herein it is assumed that m≤k<n.

Furthermore, in step S105 described above, as in the first embodiment, a weighting factor $w_r$ may be defined such that $w_r$ has a large value for an image with high resolution, and the value of $w_r$ may be employed instead of 1 in the voting. This causes images having high resolution to be more weighted in the voting than those having low resolution.

In this step S105, a weighting factor $w_t$ may also be defined such that the value of $w_t$ decreases with increasing elapsed time from the time of registering the data, and the value $w_t$ is used in voting. This makes it possible to give more importance to new registered data than to old registered data.

In the present embodiment described above, it is assumed that face images taken from all azimuth directions for each person are registered in advance in the hash table. However, alternatively, in a case where a perfect person model is not necessary from the beginning, instead of providing models of all persons, data of a plurality of face images of an average person may be registered in a hash table. During a predetermined period after the operation of the system is started, the face orientation of a person under tracking is estimated using the model of the average person. More specifically, after a comparison using hashing is performed, voting is performed only in terms of the face orientation without voting for IDs of the person. After the face orientation is estimated successfully, information associated with the ID and the face orientation of the person under tracking may be added to the hash table. By adding data of a model of a person one by one as required in the above-described manner, it is possible to operate the system without preparing face images for all persons.

To handle a positional error in extracting a person face area, n patterns may be prepared for one candidate area image by slightly shifting the candidate area image in various xy directions, and hashing and voting may be performed for these n patterns. The increase in the number of votes by a factor of n makes it possible to perform the person identification in a more reliable manner, although the amount of processing also increases by a factor of n.

In the present embodiment, as described above, it is possible to quickly identify a person using hashing. Note that there are many hashing methods, and the method usable in the present embodiment is not limited to that described above.

Third Embodiment

The method of identifying persons according to the first embodiment described above is extended in a third embodiment described below.

In the present embodiment, the absolute orientation (the face orientation direction) of a face of a person is estimated, and different features are extracted depending on the face orientation direction thereby to identify the person.

As described in, for example, U.S. Pat. No. 7,421,097 and 2003/0123713, in a case where the face orientation (face orientation direction) of a person is known, it is possible to specify a feature useful for identifying the face depending on the face orientation, and extract the specified feature. For example, when the given face image is that seen from a side, face parts such as an ear, a nose, or the like of the face are detected, and a distance or an angle between these parts may be employed as a feature. This method is known to be effective in the person identification. When the face orientation is known, it is possible to easily and reliably detect the parts of the face via rather simple processing such as template matching. The distance or the angle between parts of the face changes depending on the face orientation. However, if the face orientation angle is known, it is possible to correct such a change so as to obtain a feature value in a reliable manner.

When the face orientation is known, an image conversion may be performed using a method such as that described in U.S. Pat. No. 8,116,534 so as to correct the face orientation to be the same as or similar to a predetermined face orientation, and then a feature value such as a LBP feature may be extracted from a particular area around eyes, a nose, or the like.

As described above, knowing the face orientation angle of a person is useful to enhance the person identification accuracy. The process is described in further detail below focusing on a difference from the first embodiment.

Figure 9:
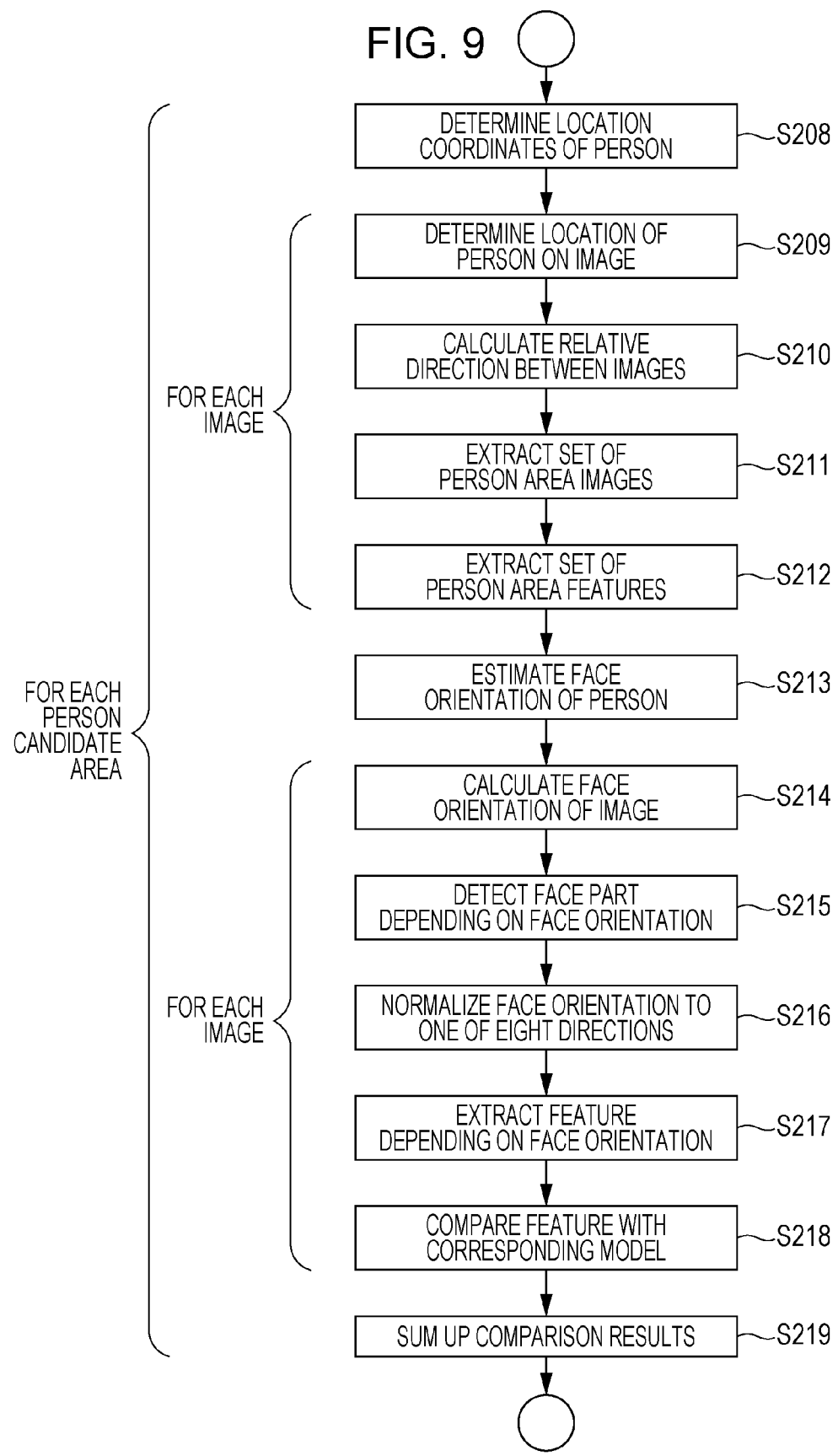
FIG. 9 is a flow chart illustrating a process according to a third embodiment.

FIG. 9 illustrates a flow of the process. Of the whole processing flow, a part that is different from the processing flow according to the first embodiment is extracted and shown in FIG. 9. More specifically, FIG. 9 illustrates a process of extracting a feature value used in identifying each person in an image. In this process, step S208 to step S211 are performed in a similar manner to step S8 to step S11 according to the first embodiment described above with reference to FIG. 2.

In step S212, a feature value of a face is extracted for use in estimating an orientation of a face of a person, and then in step S213, the orientation of the face of the person is estimated. More specifically, in a similar manner as in step S20 according to the first embodiment described above, matching is evaluated using normalized correlation with face models seen from all azimuthal directions while maintaining the relative face orientation. However, at this point of time, it is not yet known as to which person corresponds to the candidate area, and thus data of images of an average face seen from all azimuth directions is prepared in advance, and the comparison is made with respect to the average person model.

Next, based on the result of the matching evaluation, the face orientation of the person in each image is determined in step S214. Next, in step S215, a feature for use in identifying the person is extracted for each face orientation. More specifically, human face parts such as eyes, ears, a nose, or the like are detected as described above. Note that a determination is made in advance as to which human face parts are to be detected depending on the face orientation.

Next, in step S216, eight face orientations are defined by eight azimuth directions equally apart from each other by 1/8 of 360° wherein a direction in which a frontal face is seen is defined as an azimuth direction of 0°, and the direction of each image is normalized so as to be equal to or similar to a closest one of the eight directions. More specifically, the face is assumed to have a shape of a circular cylinder, and the image is subjected to a 3D-rotation image conversion using a function that performs partial expansion or compression in the x direction. Using such a function, the 3D-rotation is performed such that each human face part moves to a corresponding substantially correct location.

In this process in step S216, a correction of the face image may also be made in terms of an elevation angle. In a case where cameras in respective azimuth directions are installed at different heights, there is a difference in elevation angle at which a person is seen from the respective cameras. To handle such a situation, in a similar manner to the normalization by the 3D rotation described above, the face image may be converted to an image as seen substantially at a predetermined elevation angle.

Next, in step S217, from the converted images, feature values are extracted based on locations of human face parts. In this step, different features are extracted depending on the face orientation direction (that is, optimum features are extracted depending on the face orientation direction). More specifically, for example, when the image is a frontal image, LBP features of areas including eyes, a nose, and a mouth are extracted. In the case where the image is a face image seen from a side, the distance between an ear and a nose is extracted as a feature.

Next, in step S218, the extracted feature of each image of interest is compared with a feature of a face model having a corresponding face orientation selected from the face models stored separately according to the eight azimuth directions. More specifically, the difference between two feature value vectors is input to a discriminator such as a support vector machine or the like thereby performing learning and discriminating as to whether the features of the two images match each other. Note that the learning is performed in advance for various persons using face images taken under various conditions in terms of, for example, illumination or the like separately for each of the eight face orientations.

Figure 10A:
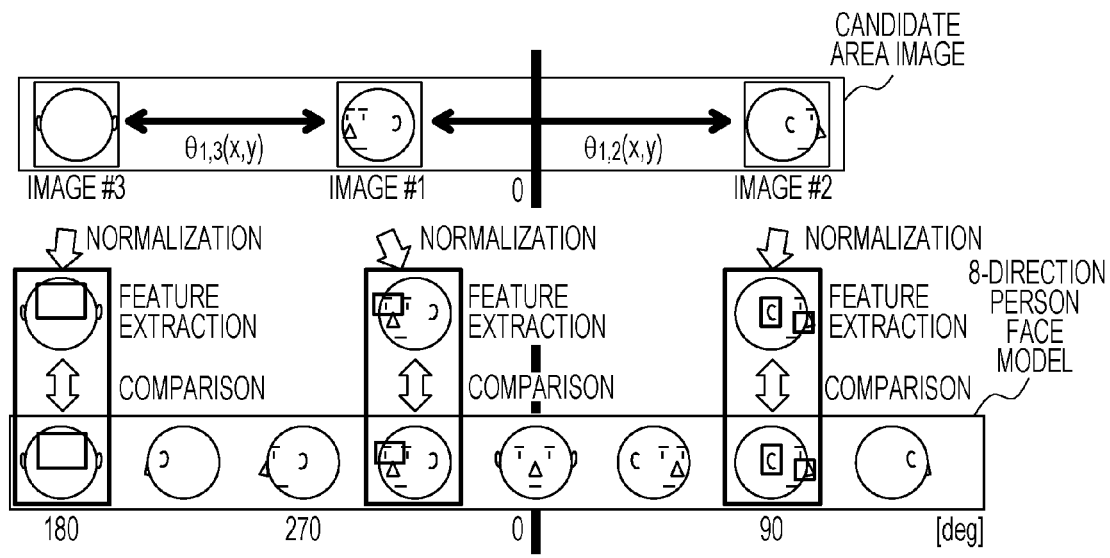
FIGS. 10A and 10B are diagrams illustrating examples of methods of estimating a face orientation and identifying a person according to the third embodiment.

Next, in step S219, comparison results obtained in the above-described manner are summed up to obtain a final identification result indicating whether the candidate area is of the person of interest. FIG. 10A schematically illustrates a manner in which the face orientation of the candidate area image is normalized, a feature is extracted, and the extracted feature is compared with a face model.

Figure 10B:
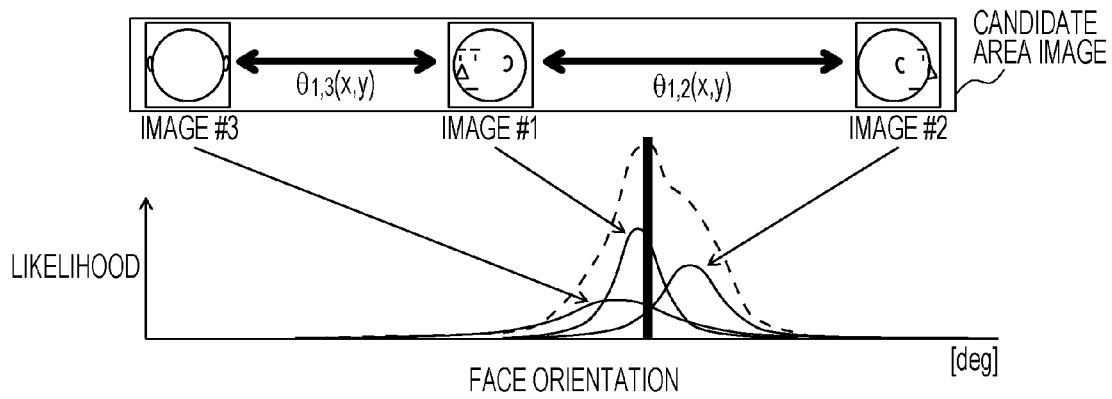

The process in step S214 of the estimation of the person face orientation may alternatively performed, for example, as described in FIG. 10B. That is, images of faces of various orientations are input in advance as input patterns, and learning is performed so as to make it possible to estimate a value of a face orientation by a regression analysis.

More specifically, for example, a regression tree method called a CART (Classification And Regression Tree) method may be used. This method is one of widely used regression analysis methods, and a description thereof may be founded, for example, in Breiman Leo, et al., "Classification and regression trees". Monterey, Calif.: Wadsworth & Brooks/Cole Advanced Books & Software, 1984. By inputting face images of various persons and associated face orientation values as learning data and learning the regression tree about the given learning data, it becomes possible to output a distribution of likelihood of face orientations for an input face image after the learning is complete. Using the likelihood distribution, voting is performed in terms of the frontal face as described in FIG. 10B. The numbers of votes are summed up (in FIG. 10B, the sum is represented by a broken curve), and a direction in which the sum has a peak is regarded as a frontal direction of the face. Note that a vertical solid bar in FIG. 10B represents the direction in which the sum has a maximum value.

Alternatively, the person face orientation may be estimated based on a direction in which a person is moving. For example, the direction in which a person is moving is detected based on the result of tracking of the person, and the detected direction is employed as the face orientation direction. In this technique, when a person moves while looking aside, the identification may fail. To handle such a situation, for example, the estimation of the face orientation based on voting illustrated in FIG. 10B may be performed taking into account the direction in which the person moves. More specifically, for example, a value of $w \times \cos(\theta - v)$ is added to the vote space $\theta$. Note that v denotes a moving direction and w denotes a predetermined weighting factor.

In the present embodiment, as described above, the face orientation direction of a person is estimated, and a feature is extracted depending on the estimated face orientation. The person is then identified based on the extracted feature. Thus, it is possible to perform the person identification with high reliability.

Fourth Embodiment

Figure 11A:
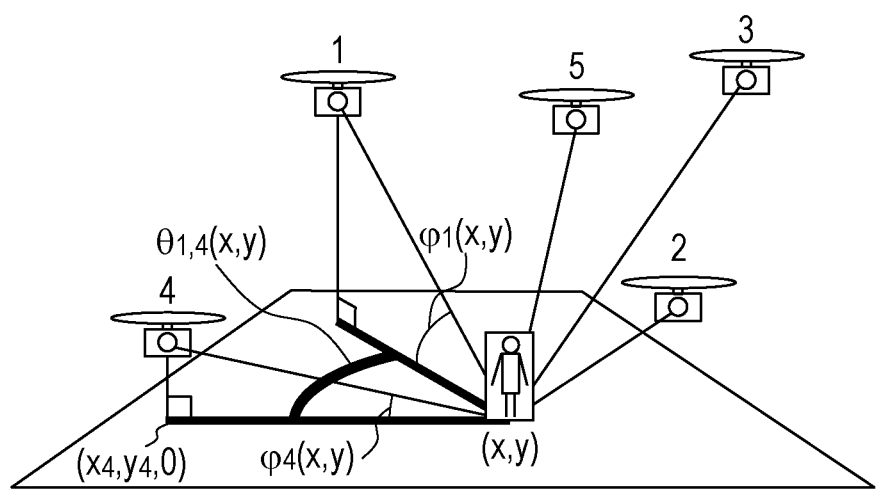
FIG. 11A is a diagram illustrating image pickup apparatuses according to a fourth embodiment and FIG. 11B is a diagram illustrating a person model according to the fourth embodiment.

In a fourth embodiment described below, an image recognition system includes a set of image pickup apparatuses 100a configured to be freely movable in a three-dimensional space. This image recognition system may be used, for example, in a situation in which an image pickup apparatus is mounted on each helicopter or balloon capable of flying in the air according to a wirelessly given control command as illustrated in FIG. 11A. Alternatively, each image pickup apparatus may be suspended from a ceiling via a plurality of wires such that the image pickup apparatus is capable of moving to an arbitrary location by controlling winding the wires. Also in this system in which set of image pickup apparatuses 100 is adapted to be capable of freely moving in the above-described manner, it is possible to identify and track a person according to the embodiment as described briefly below.

First, the location of each image pickup apparatus is calibrated such that when an image of a person is taken, the location of the person as expressed in the image is correctly expressed in the world coordinate system. This calibration may be achieved based on locations of reference markers registered in advance such as white lines and an intersection thereof on a ground as in the first embodiment described above.

However, in the present embodiment, each image pickup apparatus is allowed to freely move, and thus there is a possibility that when the reference markers are rotationally symmetric as with while lines on a ground of a playing field, it is difficult to uniquely determine a direction in which an image is taken by each image pickup apparatus. To handle such a situation, a sensor such as an electronic compass or the like is provided in each image pickup apparatus thereby to acquire an approximate direction, and uncertainness in the direction in which the image is taken is eliminated based on the direction detected by the sensor. By performing the process described above, it becomes possible to calculate the three-dimensional location (x, y, z) of the camera (image pickup apparatus) expressed in the world coordinate system at the present point of time. Note that in a case where an imaging range taken by an image pickup apparatus is small, there is a possibility that it is difficult to calculate the location of this image pickup apparatus as with the previous embodiments. In such a case, an image taken by this image pickup apparatus is not used in the process of identifying a person.

Next, relative directions between cameras are determined. More specifically, for example, as illustrated in FIG. 11A, it is assumed that a field is a flat xy plane at a height of 0, and locations of cameras i and j are given by $(x_i, y_i, z_i)$ and $(x_j, y_j, z_j)$, a point $(x_i, y_i, 0)$ and a point $(x_j, y_j, 0)$ are determined at which perpendicular lines extending from the respective cameras i and j intersect the xy plane. An angle $\theta_{i,j}$ made by these two points and a location (x, y, 0) of a person on the ground is determined as an azimuth angle indicating the relative direction between the cameras i and j, and the determined value is stored. The height of each camera is known, and thus elevation angles $\phi_i$ and $\phi_j$ at which the respective cameras are seen from the location (x, y, 0) of the person are determined and stored. These three variables are employed to express a relative angle between cameras that may vary depending on the location of the person and the locations of the cameras.

Figure 11B:
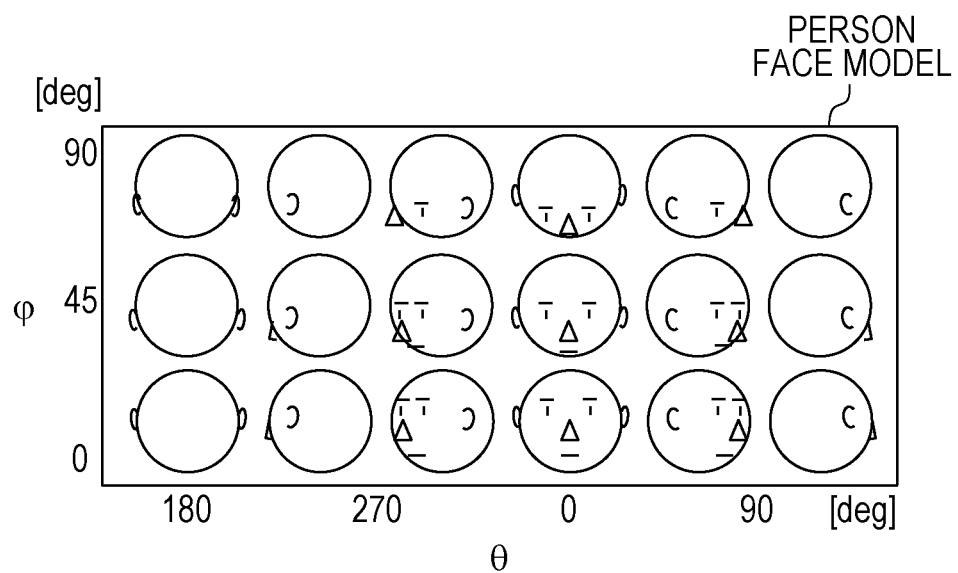

Using the values of relative directions, template matching is performed using a plurality of images at the same time without determining the absolute face orientation direction of the person. More specifically, for example, as illustrated in FIG. 11B, a candidate area image is compared with a person model including face images seen from all azimuth directions at all elevation angles, that is, seen from all hemispherical directions. In this method, the comparison needs a greater amount of calculation than is needed in the model using only the azimuth directions. To handle this situation, hashing may be used to achieve high-speed comparison between a plurality of face area image and a plurality of person models as described in the previous embodiments. The comparison results obtained in this manner are voted in a three-dimensional vote space in terms of the person ID, the face orientation direction θ of the image taken by the camera 1, and the elevation angle φ, as in the second embodiment. The votes are summed and the person and the face orientation are identified based on the vote result. Alternatively, the voting may be performed in a two-dimensional vote space in terms of the person ID and the azimuth angle θ without voting the elevation angle φ.

In the present embodiment, as described above, the location of each image pickup apparatus as expressed in the three-dimensional world coordinate system is calculated. The relative angle between different image pickup apparatuses is calculated based on the locations of the respective image pickup apparatuses. Thus, it is possible to track a person even in the case where image pickup apparatuses move freely in a three-dimensional space.

In the image recognition system according to one of the embodiments, a person is identified using images of the person taken from a plurality of directions. The images used in the identification are not limited to frontal images, and thus it is possible to perform the person identification quickly on a real-time base. Furthermore, use of relative directions between images in comparison between a plurality of images and registered images makes it possible to more robustly identify a freely moving person.

Embodiments may be used advantageously in a wide variety of applications such as automatically generating behavior history of a player in a sports scene, visualizing a behavior thereby enhancing the entertainment quality, increasing robustness and/or accuracy in a security system or a person identification system using monitor cameras.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-121862, filed Jun. 12, 2014, which is hereby incorporated by reference herein in its entirety

What is claimed is:

1. An image recognition apparatus comprising:
   an inter-image relative direction acquisition unit configured to acquire a relative direction relationship between a first input area image and a second input area image obtained by taking images of a particular person from different directions;

a person identification unit configured to identify the particular person by comparing a feature of the first input area image with a feature of a first registered area image included in a set of registered area images including registered area images obtained by taking images of the particular person or another person from at least three directions, comparing a feature of the second input area image with a feature of a second registered area image of the same person as the person of the first registered area image included in the set of registered area images, and determining whether the person in the first and second input area images is the same as the person in the first and second registered area images, wherein the first registered area image and the second registered area image are selected such that the relative direction relationship between the first registered area image and the second registered area image is equal or similar to the relative direction relationship between the first input area image and the second input area image; and a person tracking unit configured to track the particular person in an input image and estimate the location coordinate information of the particular person, wherein the inter-image relative direction acquisition unit acquires the relative direction relationship between the first input area image and the second input area image based on location coordinate information associated with a first image pickup apparatus by which the first input image is taken, location coordinate information associated with a second image pickup apparatus by which the second input image is taken, and location coordinate information associated with the particular person estimated by the person tracking unit, wherein the relative direction relationship between images is a relative relationship between the images in terms of angle in a horizontal plane.

2. The image recognition apparatus according to claim 1, further comprising:

a person location estimation unit configured to estimate the location of the particular person in the input image;

a person area extraction unit configured to be given a first input image and a second input image obtained by taking images of the particular person from different directions, and extract the first input area image and the second input area image respectively from the first input image and the second input image based on the location of the person estimated by the person location estimation unit;

a feature extraction unit configured to extract a feature from the first input area image and a feature from the second input area image; and a person area feature storage unit configured to store the feature of each registered area image in the set of registered area images, wherein the person identification unit receives the feature of the first input area image and the feature of the second input area image from the feature extraction unit, and receives the feature of the first registered area image and the feature of the second registered area image from the person area feature storage unit.

3. The image recognition apparatus according to claim 2, wherein the person area feature storage unit updates the features of the registered area images using a result of the determination performed by the person identification unit.

4. The image recognition apparatus according to claim 2, wherein the person area feature storage unit stores in advance a hash table describing a hash value calculated from each registered area image in relation to the registered area image, and the person identification unit calculates a hash value from an input area image and identifies a person using the calculated hash value and the hash table.

5. The image recognition apparatus according to claim 1, wherein the person identification unit gives a higher weight to an image with a higher resolution in comparing the features.

6. The image recognition apparatus according to claim 1, wherein the person identification unit gives a higher weight to an image of a person taken from a closer distance in comparing the features.

7. The image recognition apparatus according to claim 1, wherein the feature of each input area image and the feature of each registered area image are each obtained from a face area.

8. The image recognition apparatus according to claim 1, wherein the feature of each input area image and the feature of each registered area image are each obtained from a face area and a trunk area.

9. The image recognition apparatus according to claim 1, wherein the person identification unit estimates a face orientation direction.

10. The image recognition apparatus according to claim 9, wherein when the person identification unit performs identification, the person identification unit uses a different feature depending on the estimated face orientation direction.

11. The image recognition apparatus according to claim 9, wherein the person identification unit estimates the face orientation direction based on a direction in which a person moves.

12. An image recognition apparatus comprising:

an inter-image relative direction acquisition unit configured to acquire a relative direction relationship between a first input area image and a second input area image obtained by taking images of a particular person from different directions; and a person identification unit configured to identify the particular person by comparing a feature of the first input area image with a feature of a first registered area image included in a set of registered area images including registered area images obtained by taking images of the particular person or another person from at least three directions, comparing a feature of the second input area image with a feature of a second registered area image of the same person as the person of the first registered area image included in the set of registered area images, and determining whether face orientations respectively captured in the first and second input area images are the same as face orientations respectively captured in the first and second registered area images at the same time, wherein the first registered area image and the second registered area image are selected such that the relative direction relationship between the first registered area image and the second registered area image is equal or similar to the relative direction relationship between the first input area image and the second input area image; and a person tracking unit configured to track the particular person in an input image and estimate the location coordinate information of the particular person, wherein the inter-image relative direction acquisition unit acquires the relative direction relationship between the first input area image and the second input area image based on location coordinate information associated with a first image pickup apparatus by which the first input image is taken, location coordinate information associated with a second image pickup apparatus by which the second input image is taken, and location coordinate information associated with the particular person estimated by the person tracking unit wherein the relative direction relationship between images is a relative relationship between the images in terms of angle in a horizontal plane.

13. An image recognition system including a plurality of image pickup apparatuses and an image recognition apparatus,
the image pickup apparatus comprising:
an image sensing unit installed at a fixed location and configured to take an image of a particular area,
the image recognition apparatus comprising:
an acquisition unit configured to acquire a first relationship in terms of a relative direction between the image pickup apparatuses at the locations in a situation in which images of a location within the particular area are taken by the image pickup apparatuses;
a setting unit configured to set, as an object to be recognized, a set of images of face areas extracted from a plurality of captured images obtained by taking the same location at the same time by the plurality of image pickup apparatuses;
an obtainment unit configured to obtain a second relationship in terms of a face orientation between the set of images of face areas based on the first relationship; and
a recognition unit configured to recognize a face of the face area by comparing a set of registered images of a plurality of face orientations of a same person taken in advance and the set of images of the face area in a state in which the second relationship is kept;
an inter-image relative direction acquisition unit configured to acquire a relative direction relationship between a first input area image and a second input area image obtained by taking images of a particular person from different directions;
a person tracking unit configured to track the particular person in an input image and estimate the location coordinate information of the particular person,
wherein the inter-image relative direction acquisition unit acquires the relative direction relationship between the first input area image and the second input area image based on location coordinate information associated with a first image pickup apparatus by which the first input image is taken, location coordinate information associated with a second image pickup apparatus by which the second input image is taken, and location coordinate information associated with the particular person estimated by the person tracking unit, wherein the relative direction relationship between images is a relative relationship between the images in terms of angle in a horizontal plane.

14. The image recognition system according to claim 13, wherein the recognition unit compares a first registered image included in the set of registered images with a first image in the set of images of the face areas and compares a second registered image included in the set of registered images with a second image in the set of images of the face areas thereby to recognize whether a person captured in the images of the face areas is the same person captured in the registered images.

15. The image recognition system according to claim 13, wherein the set of registered images is registered in relation to an angle of a face with respect to a reference face facing right ahead.

16. An image recognition method comprising:
calculating a relative direction relationship between a first input area image and a second input area image obtained by taking images of a particular person from different directions; a person identification unit configured to identify identifying the particular person; using one or more processors by comparing a feature of the first input area image with a feature of a first registered area image included in a set of registered area images including registered area images obtained by taking images of the particular person or another person from at least three directions, comparing a feature of the second input area image with a feature of a second registered area image of the same person as the person of the first registered area image included in the set of registered area images, and determining whether the person in the first and second input area images is the same as the person in the first and second registered area images,
wherein the first registered area image and the second registered area image are selected such that the relative direction relationship between the first registered area image and the second registered area image is equal or similar to the relative direction relationship between the first input area image and the second input area image;
tracking the particular person in an input image and estimating the location coordinate information of the particular person, a
acquiring the relative direction relationship between the first input area image and the second input area image based on location coordinate information associated with a first image pickup apparatus by which the first input image is taken, location coordinate information associated with a second image pickup apparatus by which the second input image is taken, and the location coordinate information associated with the particular person wherein the relative direction relationship between images is a relative relationship between the images in terms of angle in a horizontal plane.

17. A non-transitory computer readable medium storing a computer-executable program for causing a computer to perform the image recognition method according to claim 16.

* * * * *